United States Patent [19]
Walczak et al.

[11] Patent Number: 5,818,348
[45] Date of Patent: Oct. 6, 1998

[54] METHOD AND RADIO FREQUENCY IDENTIFICATION SYSTEM FOR A NOVEL PROTOCOL FOR RELIABLE COMMUNICATION

[75] Inventors: Thomas Joseph Walczak, Woodstock; Donald Bernard Lemersal, Jr., Chicago, both of Ill.

[73] Assignee: Motorola, Inc., Schaumburg, Ill.

[21] Appl. No.: 898,776

[22] Filed: Jul. 23, 1997

Related U.S. Application Data

[63] Continuation of Ser. No. 402,599, Mar. 13, 1995, abandoned.

[51] Int. Cl.⁶ ..................................................... H04Q 1/00
[52] U.S. Cl. ...................................... 340/825.54; 455/603
[58] Field of Search ........................ 340/825.54, 572; 455/603

[56] References Cited

U.S. PATENT DOCUMENTS

| | | | |
|---|---|---|---|
| 4,691,202 | 9/1987 | Denne | 340/825.54 |
| 4,837,568 | 6/1989 | Snaper | 340/825.54 |
| 5,196,846 | 3/1993 | Brockelsby et al. | 340/933 |
| 5,351,187 | 9/1994 | Hassett | 364/401 |
| 5,467,081 | 11/1995 | Drews | 340/825.54 |

*Primary Examiner*—Brian Zimmerman
*Attorney, Agent, or Firm*—Darleen J. Stockley

[57] ABSTRACT

Reliable communication is provided by a radio frequency identification system comprising at least one of an interrogator (102) and a transponder (104). The interrogator (102) transmits a plurality of interrogator frames (106) and receives at least one of a plurality of transponder frames (114). The transponder (104) transmits the plurality of transponder frames (114) and receives at least one of the plurality of interrogator frames (106). Each frame in the plurality of interrogator frames and the plurality of transponder frames includes an initialization sequence (108 and 116), at least one information sequence of a first predetermined length (110 and 118), and a check sequence of a second predetermined length (112 and 120) for each information sequence.

32 Claims, 4 Drawing Sheets

FIG.11 ns. METHOD AND RADIO FREQUENCY
IDENTIFICATION SYSTEM FOR A NOVEL
PROTOCOL FOR RELIABLE
COMMUNICATION

This is a continuation of application Ser. No. 08/402,599, filed Mar. 13, 1995 and now abandoned.

FIELD OF THE INVENTION

The present invention relates generally to radio frequency identification systems, and more particularly to communication protocol in radio frequency identification systems.

BACKGROUND OF THE INVENTION

The multibillion-dollar automatic identification industry encompasses bar code equipment, magnetic strip card readers, smart cards, optical character recognition, scanners, voice recognition systems, and radio frequency identification, RFID, systems. RFID systems began to be used in the mid-1980's. In 1993, it was estimated that bar code equipment accounted for over 75 percent of the world wide revenue in the auto ID market, and RFID accounted for 3 percent.

Bar codes provide an excellent means of data collection for a small cost. The drawback of bar codes is the requirement for a direct line of sight from reader to tag. Bar codes are usually unreadable when ripped or blocked by things such as dirt, snow, etc. Most of problems encountered in the use of bar codes can be avoided by using RFID tags.

Typically an RFID tag system is comprised of tags or transponders and base units or interrogators. A transponder is said to be interrogated when it receives a signal from the interrogator. Typically, the transponder responds by sending back one or more signals indicative of the data stored on the tag. In addition to the ability to be read without a line of sight to the reader, some RFID transponders can be read from as far away as 100 m and at speeds up to 300 km per hour. Generally, the data capacity ranges from 1 bit to 64,000 bits, and the operating frequencies range from 37 kHz to 2.45 GHz. Applications range from tracking fish migration to communicating vehicle information to a fleet management system.

There are also RFID systems that write data to and read data from transponders. The target market for the read/write RFID systems is access control. For example, a bus pass may have a balance stored in memory and a fare may be deducted from the balance using an RFID system.

Since many read/write RFID systems will be used for financial transactions, there exists a need for a reliable RFID protocol. A reliable protocol is needed to provide efficient data transfer with protection from false transmission and detection of errors.

DETAILED DESCRIPTION OF PREFERRED EMBODIMENTS

Generally, the present invention provides a protocol for a radio frequency identification, RFID, system. The RFID system is comprised of at least one interrogator and at least one transponder. The protocol allows the interrogator to access the transponder with a very low rate of errors or false transactions.

Figure 1:
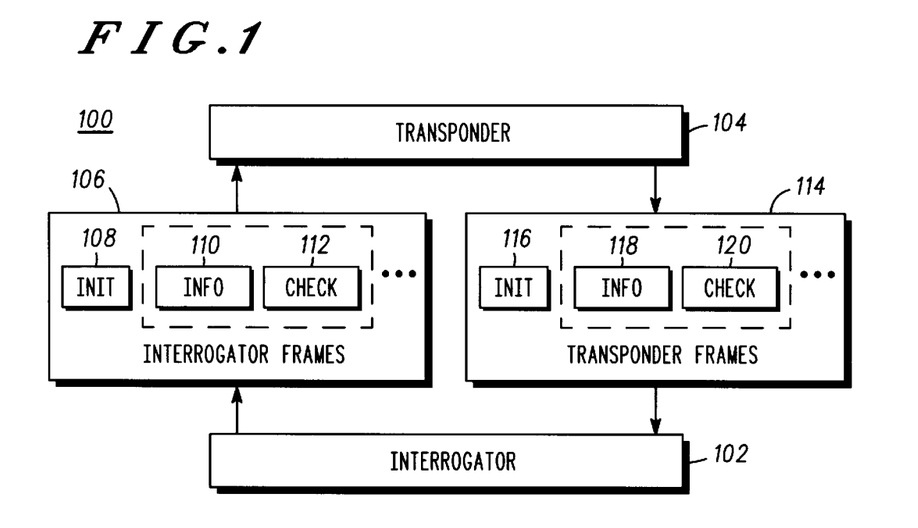
FIG. 1 is a diagram of a preferred embodiment of a radio frequency identification system for providing a reliable communication protocol in accordance with the present invention.

FIG. 1, numeral 100, is a diagram of a preferred embodiment of a radio frequency identification system for providing a reliable communication protocol in accordance with the present invention. The radio frequency identification system comprises an interrogator (102) and a transponder (104).

The interrogator (102) or reader transmits a plurality of interrogator frames (106) and receives at least one of a plurality of transponder frames (114). The transponder (104) or tag transmits the plurality of transponder frames (114) and receives at least one of the plurality of interrogator frames (106). A typical interrogator includes at least one antenna for transmitting and receiving, an RF unit connected to the antenna, and a digital controller. Since a typical interrogator or reader is known, further description is not provided here. An example of a typical interrogator is described in U.S. Pat. No. 5,196,846. The present invention, however, may be implemented utilizing other interrogators. The digital controller determines the interrogator frame (106) to be sent and decodes the transponder frame (114) that was received. In some applications the interrogator is connected to a peripheral device such as a computer.

A typical transponder includes a receiver/transmitter unit, a control circuit, and a memory device. Since a typical transponder is known, further description is not provided here. An example of a typical transponder is described in U.S. Pat. No. 5,196,846. The present invention, however, may be implemented utilizing other transponders. The data capacity of the memory device is based on the size and cost constraints of a given application. Current data capacities range from 1 bit to several thousand bits. The control circuit reads data stored in the memory device to provide a signal to be transmitted by the receiver/transmitter unit. The signal may be provided using a modulation scheme such as binary phase shift keying, BPSK. The control circuit may also interpret signals received by the receiver/transmitter unit and may write data based on the signals into the memory device.

In order to communicate, the transponder (104) must be located within the coverage area of the interrogator (102). A coverage area is determined by the frequency of operation, the transmitted power, and the antennas used in the interrogator (102) and transponder (104). Coverage areas may range from a few millimeters to hundreds of meters.

Each frame in the plurality of interrogator frames (106) and the plurality of transponder frames (114) includes an initialization sequence (init, 108 and 116), at least one information sequence of a first predetermined length (info, 110 and 118), and a check sequence of a second predetermined length (check, 112 and 120) for each information sequence. The initialization sequence typically includes a dotting sequence for recovering clock timing and a sync pattern for establishing data alignment and determining data polarity. In order to distinguish an interrogator frame from a transponder frame, the interrogator frames and the transponder frames have different sync patterns. This prevents an unintentional communication of one transponder with another transponder.

Once an initialization sequence is transmitted, any number of information sequences may be sent. Each information sequence is followed by a check sequence. In order to determine the beginning of one sequence and the end of another, the lengths of the information sequences and the check sequences are predetermined. Each information sequence is verified as the corresponding check sequence is received. A preferred check sequence is a cyclic redundancy check sequence calculated from the information sequence. Additional reliability is provided with a check sequence that performs error correction in addition to error detection. A preferred length of the information sequence is 17, and a preferred length of the check sequence is 8.

Figure 2:
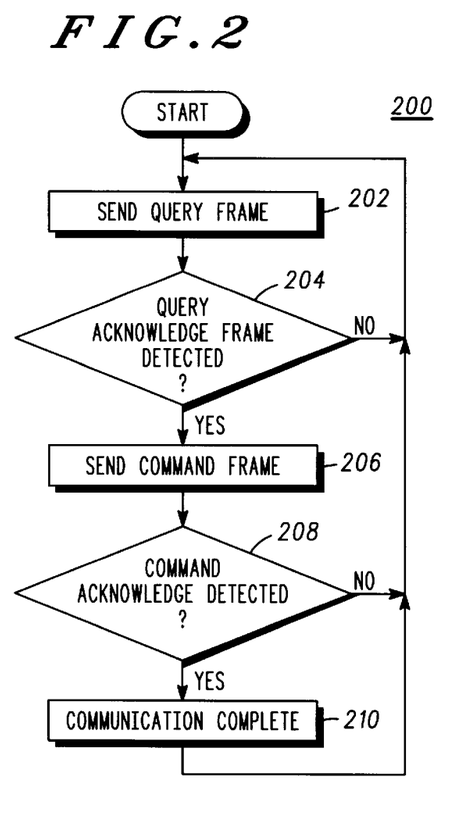
FIG. 2 is a flow diagram of a preferred embodiment of steps of a method for using an interrogator to provide a reliable communication protocol in accordance with the present invention.

FIG. 2, numeral 200, is a flow diagram of a preferred embodiment of steps of a method for using an interrogator to provide a reliable communication protocol in accordance with the present invention. Upon start-up, the interrogator sends a query frame (202) and waits for a query acknowledge frame (204). If no query acknowledge frame is detected, the interrogator sends another query frame (202). If the query acknowledge frame is detected, the interrogator sends a command frame (206) and waits for a command acknowledge frame (208). When the command frame is a read command frame, the command acknowledge frame includes data stored on a transponder. When the command frame is a write command frame, the command acknowledge frame may be identical to the query acknowledge frame. If a command acknowledge is detected (208), communication is complete (210) and the communication link may be reestablished by sending another query frame (202). If a command acknowledge frame is not detected, the interrogator sends another query frame (202).

Figure 3:
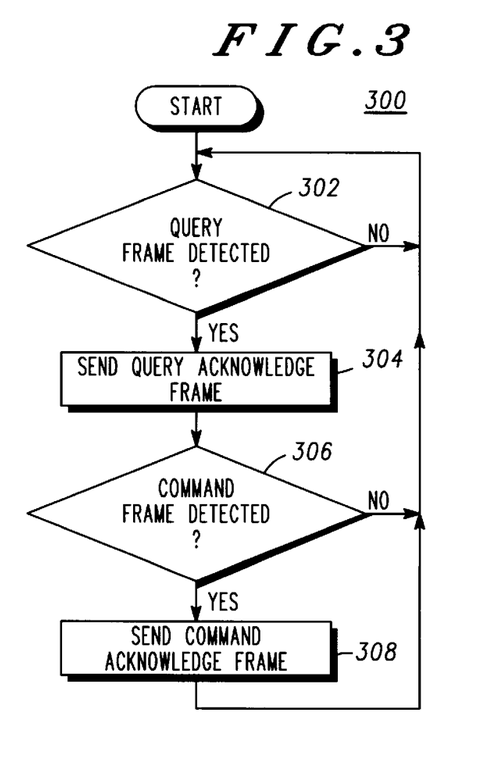
FIG. 3 is a flow diagram of a preferred embodiment of steps of a method for using a transponder to provide a reliable communication protocol in accordance with the present invention.

FIG. 3, numeral 300, is a flow diagram of a preferred embodiment of steps of a method for using a transponder to provide a reliable communication protocol in accordance with the present invention. When in the coverage area and upon start-up, the transponder monitors whether a query frame is detected (302). If no query is detected, the monitoring continues. If the query is detected, the transponder sends a query acknowledge frame (304) and waits for a command. If a command is detected (306), data in a memory unit in the transponder is typically accessed, a command acknowledge frame is sent (308), and the transponder continues to monitor for a query frame (302). If a command is not detected, the transponder continues to monitor for a query frame (302).

Figure 4:
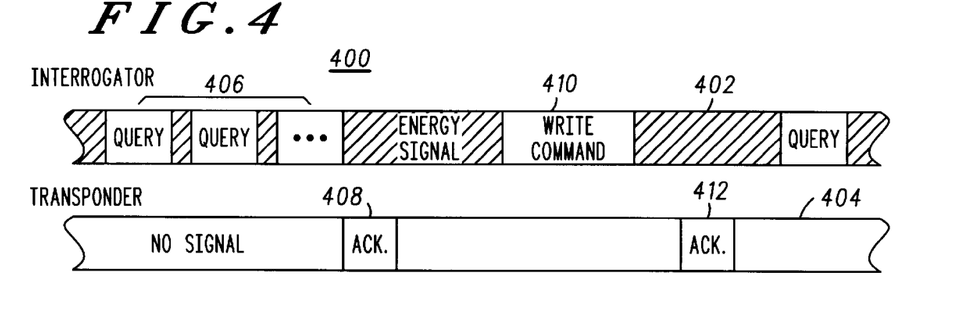
FIG. 4 is a diagram of a preferred embodiment of a write protocol in accordance with the present invention.

FIG. 4, numeral 400, is a diagram of a preferred embodiment of a write protocol in accordance with the present invention. The transmitted signal from the interrogator (402) over time includes at least one query frame (406) and a write command (410). The transmitted signal from the transponder (404) over time includes at least two acknowledge frames (408 and 412). When the transponder is to be powered by the interrogator, an energy signal is continuously transmitted within the signal from the interrogator (402).

The query frame (406) is repeated until the transponder sends a first acknowledge frame (408). This establishes a communication link, and the interrogator sends a write command (410) that is responded to with a second acknowledge frame (412).

Figure 5:
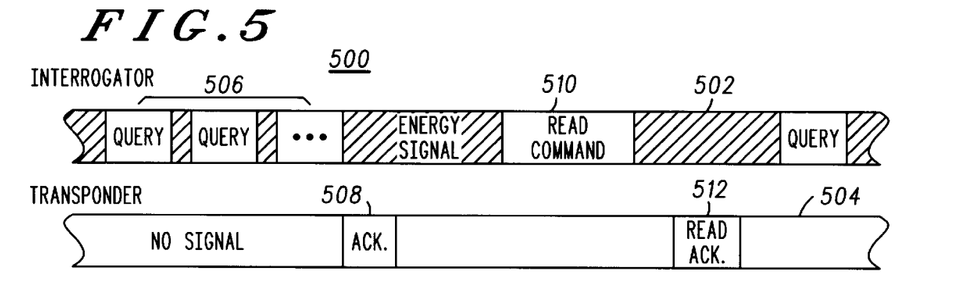
FIG. 5 is a diagram of a preferred embodiment of a read protocol in accordance with the present invention.

FIG. 5, numeral 500, is a diagram of a preferred embodiment of a read protocol in accordance with the present invention. The transmitted signal from the interrogator (502) over time includes at least one query frame (506) and a read command (510). The transmitted signal from the transponder (504) over time includes at least one acknowledge frame (508) and a read acknowledge frame (512). When the transponder is to be powered by the interrogator, an energy signal is continuously transmitted within the signal from the interrogator (502).

The query frame (506) is repeated until the transponder sends a first acknowledge frame (508). This establishes a communication link, and the interrogator sends a read command (510) that is responded to with the read acknowledge frame (512).

Figure 6:
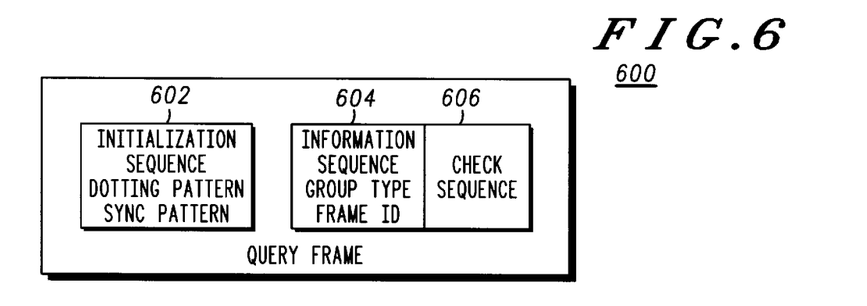
FIG. 6 is a diagram of a preferred embodiment of a query frame in accordance with the present invention.

FIG. 6, numeral 600, is a diagram of a preferred embodiment of a query frame in accordance with the present invention. The query frame includes an initialization sequence (602) with a dotting pattern and sync pattern, at least one information sequence (604), and at least one check sequence (606). The first information sequence (604) of the query frame includes a transponder group type and a frame identifier (ID).

The transponder group type identifies the group, classification, or vendor. A typical group type is 16 bits long. The frame identifier differentiates a query from a command. A typical frame identifier for a query frame is a single bit set to 1.

Figure 7:
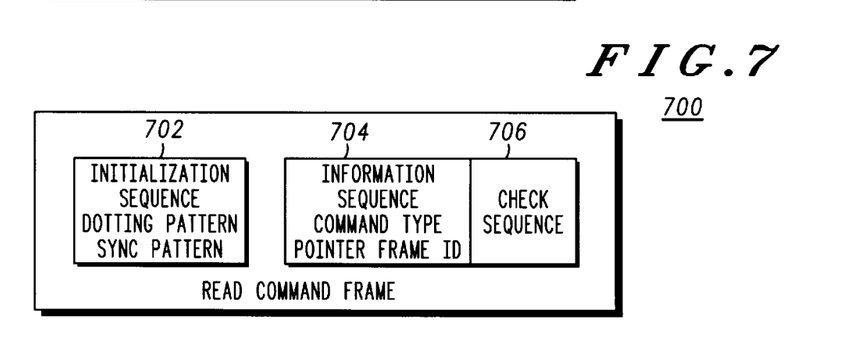
FIG. 7 is a diagram of a preferred embodiment of a read command frame in accordance with the present invention.

FIG. 7, numeral 700, is a diagram of a preferred embodiment of a read command frame in accordance with the present invention. The read command frame includes an initialization sequence (702) with a dotting pattern and sync pattern, at least one information sequence (704), and at least one check sequence (706). The first information sequence (704) of the read command frame includes a command type, a pointer, and a frame identifier (ID).

The command type identifies the action to be taken by the transponder. The read command is identified as either read one block from memory or read to the end of memory. The pointer identifies the first memory location from which to begin the transmission by the transponder. The frame identifier identifies the frame as a command. A typical frame identifier for a command frame is a single bit set to 0.

Figure 8:
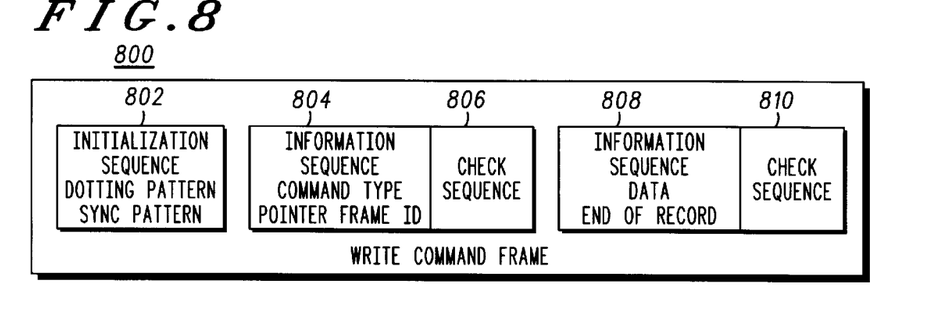
FIG. 8 is a diagram of a preferred embodiment of a write command frame in accordance with the present invention.

FIG. 8, numeral 800, is a diagram of a preferred embodiment of a write command frame in accordance with the present invention. The write command frame includes an initialization sequence (802) with a dotting pattern and sync pattern, at least two information sequences (804 and 808), and at least two check sequences (806 and 810). The first information sequence (804) includes a command type, a pointer, and a frame identifier (ID) and the second information sequence (808) and each information sequence thereafter includes a string of data to be stored on the transponder and an end of record identifier.

In FIG. 8, the command type identifies the frame as a write command. The pointer identifies the first memory location to which data is stored on the transponder. As with the read command, the frame identifier identifies the frame as a command. A typical frame identifier for a command frame is a single bit set to 0. Strings of data to be stored on the transponder are sent following the first information sequence. The end of record, EOR, identifier is a single bit following each string of data. Typically, all EOR identifiers are set to 0 except for the final EOR identifier which is set to 1 to signify that the transmission is complete.

Figure 9:
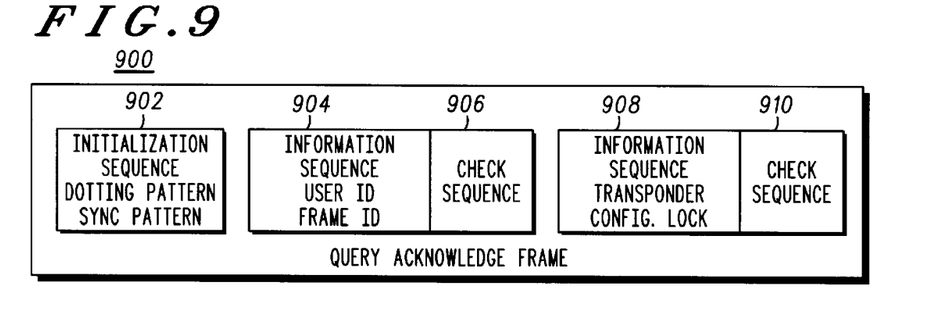
FIG. 9 is a diagram of a preferred embodiment of a query acknowledge frame in accordance with the present invention.

FIG. 9, numeral 900, is a diagram of a preferred embodiment of a query acknowledge frame in accordance with the present invention. 9. The query acknowledge frame includes an initialization sequence (902) with a dotting pattern and sync pattern, at least two information sequences (904 and 908), and at least two check sequences (906 and 910). The first information sequence (904) includes a unique transponder code or user ID and a frame identifier (ID) and the second information sequence (908) includes a transponder configuration identifier (config) and a lock identifier (ID).

The user ID is unique to every transponder and is stored permanently in memory. The length of the user ID is determined by the number of transponders in an application. Typically, the user ID is longer than the predetermined length of the information sequence and must occupy more than one information sequence. The frame identifier signifies what type of frame is being acknowledged. A typical frame identifier for a query acknowledge frame is a single bit set to 1. The transponder configuration identifier identifies features of a tag such as data capacity. The lock identifier identifies which words are locked in memory. Typically once a word is locked, the word cannot be unlocked or overwritten.

Figure 10:
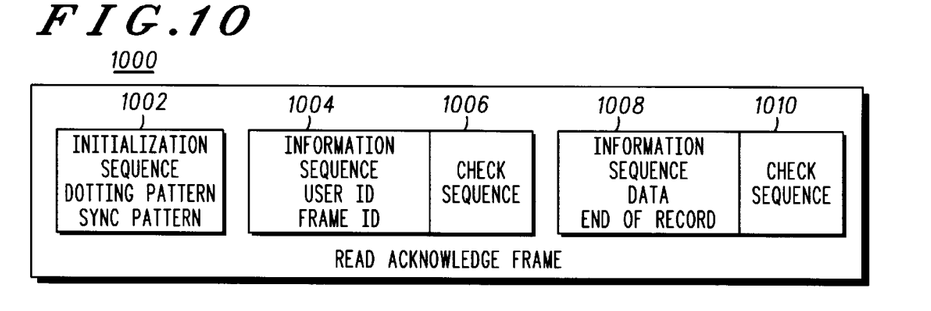
FIG. 10 is a diagram of a preferred embodiment of a read acknowledge frame in accordance with the present invention.

FIG. 10, numeral 1000 is a diagram of a preferred embodiment of a read acknowledge frame in accordance with the present invention. The read acknowledge frame includes an initialization sequence (1002) with a dotting pattern and sync pattern, at least two information sequences (1004 and 1008), and at least two check sequences (1006 and 1010). The first information sequence (1004) includes a unique transponder code and a frame identifier and the second information sequence (1008) and each information sequence thereafter includes a string of data stored on the transponder and an end of record identifier.

The user ID is unique to every transponder of a particular type and is stored in memory. The length of the user ID is determined by the number of transponders in an application. Typically, the user ID is longer than the predetermined length of the information sequence and must occupy more than one information sequence. The frame identifier signifies what type of frame is being acknowledged. A typical frame identifier for a read acknowledge frame is a single bit set to 0. Strings of data that are stored on the transponder are sent following the first information sequence. The end of record, EOR, identifier is a single bit following each string of data. All EOR identifiers are set to 0 except for the final EOR identifier which is set to 1 to signify that the transmission is complete.

Figure 11:
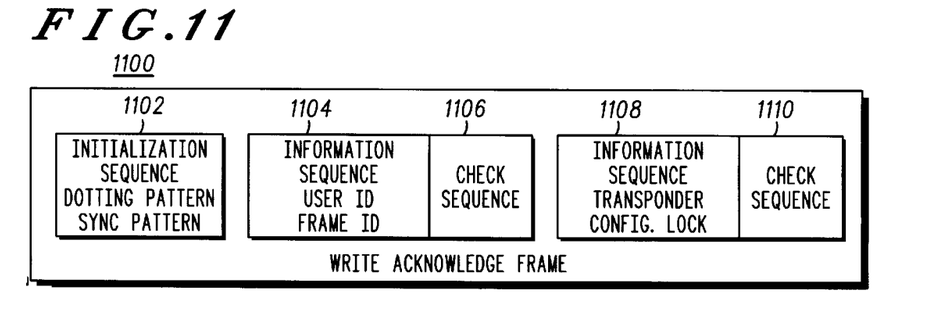
FIG. 11 is a diagram of a preferred embodiment of a write acknowledge frame in accordance with the present invention.

FIG. 11, numeral 1100, is a diagram of a preferred embodiment of a write acknowledge frame in accordance with the present invention. The read command frame includes an initialization sequence (1102) with a dotting pattern and sync pattern, at least two information sequences (1104 and 1108), and at least two check sequences (1106 and 1110). The first information sequence (1104) includes a unique transponder code (user ID) and a frame identifier (ID) and the second information sequence (1108) includes a transponder configuration (config) identifier.

The write acknowledge frame (1100) may be identical to the query acknowledge frame (900). The user ID is unique to every transponder and is stored permanently in memory. The length of the user ID is determined by the number of transponders in an application. Typically, the user ID is longer than the predetermined length of the information sequence and must occupy more than one information sequence. The frame identifier signifies what type of frame is being acknowledged. Since write acknowledge frame (1100) may be identical to the query acknowledge frame (900), a typical frame identifier for a write acknowledge frame is a single bit set to 1. The transponder configuration identifier identifies features of a tag such as data capacity. The lock identifier identifies which words are locked in memory. Once a word is locked it cannot be unlocked or overwritten.

Figure 12:
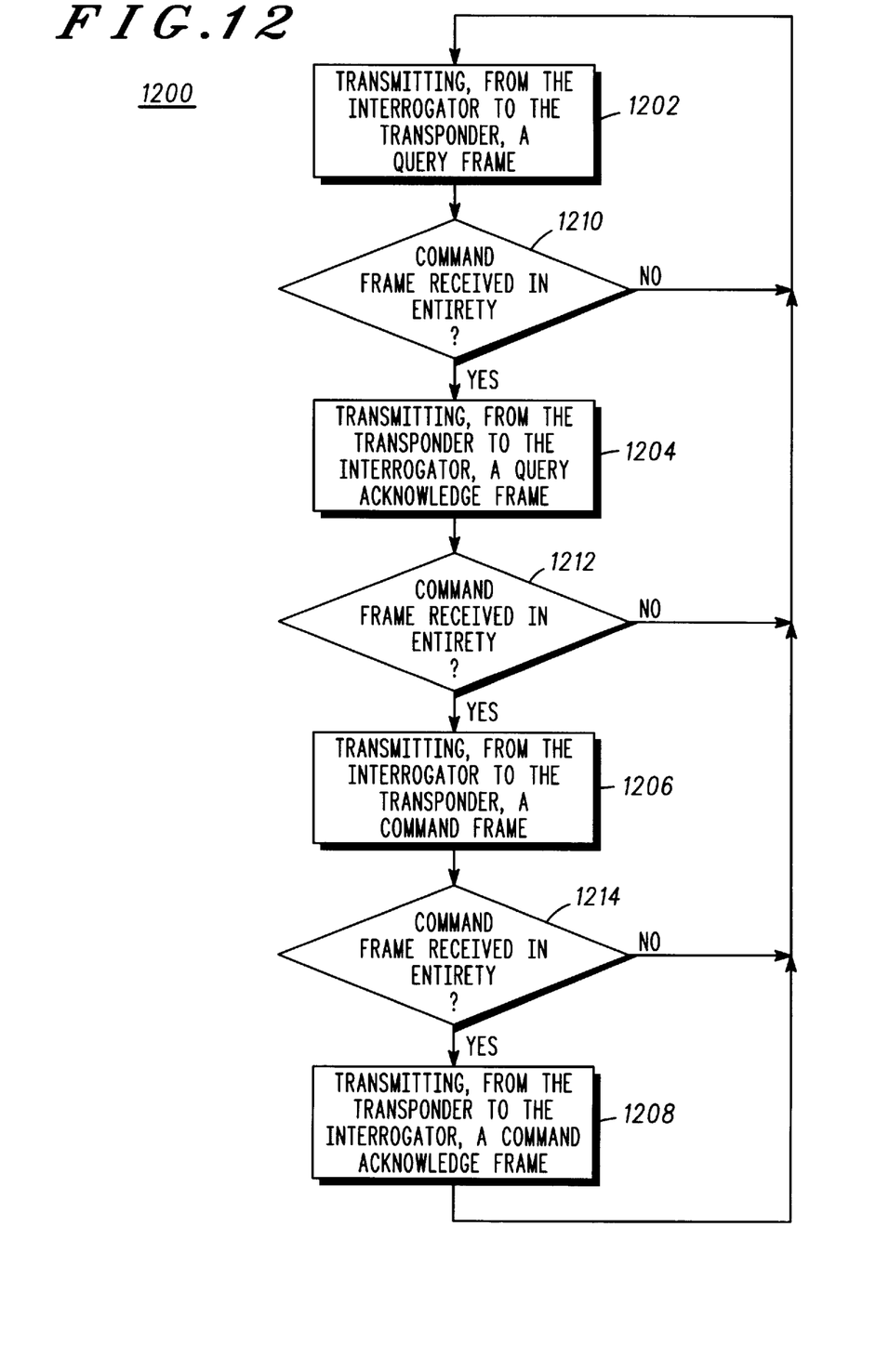
FIG. 12 is a flow diagram of a preferred embodiment of steps of a method for providing a reliable communication protocol in accordance with the present invention.

FIG. 12, numeral 1200, is a flow diagram of a preferred embodiment of steps of a method for providing a reliable communication protocol in accordance with the present invention. The radio frequency identification system comprises an interrogator and a transponder. To initiate communication, the first step is transmitting, from the interrogator to the transponder, a query frame (1202). The query frame identifies the type of transponder which is expected to be in the coverage area of the interrogator. A type may identify a manufacturer, an article associated with the transponder, or any other difference that could interfere with normal operation. The query frame is transmitted until a transponder with the specified type receives the query frame in its entirety (1210). The next step is transmitting, from the transponder to the interrogator, a query acknowledge frame (1204). If the query acknowledge frame is received in its entirety by the interrogator (1212), the next step is transmitting, from the interrogator to the transponder, a command frame (1206). If the command frame is received in its entirety (1214), the final step is transmitting, from the transponder to the interrogator, a command acknowledge frame (1208). Every frame includes an initialization sequence, at least one information sequence of a first predetermined length, and a check sequence of a second predetermined length for each information sequence. If any frame is not received in its entirety (1210, 1212, and 1214) or is received incorrectly based on the check sequence, the protocol restarts by sending another query frame from the interrogator (1202).

With the protocol of the present invention, a reliable protocol can be achieved between a transponder and an interrogator. This protocol will allow the interrogator to access the memory unit of the transponder over the air with a very low rate of errors or false transactions. Reliability is especially important for read/write applications which require monetary transactions.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for providing a reliable communication protocol in a radio frequency identification system, the method comprising at least one of:

A) interrogating by:
  i) transmitting a query frame having an initialization sequence, at least one information sequence of a first predetermined length, and a check sequence of a second predetermined length for each information sequence wherein at least the first information sequence of the query frame includes a transponder group type and a frame identifier and the transponder group type identifies at least one of: a group, classification, and vendor and the frame identifier differentiates the query frame from a command frame;
  ii) receiving a query acknowledge frame having an initialization sequence, at least one information sequence of the first predetermined length, and a check sequence of the second predetermined length for each information sequence;
  iii) transmitting a command frame, wherein the command frame is one of:
    iii1) a read command frame that includes an initialization sequence, at least one information sequence, and a check sequence of the second predetermined length for each information sequence wherein the at least one information sequence of the read command frame includes (iii1a) a command type that identifies an action to be taken by a transponder, (iii1b) a pointer that identifies a first memory location from which to begin the transmission by the transponder, and (iii1c) a frame identifier that identifies the frame as a command frame; and
    iii2) a write command frame that includes an initialization sequence, at least two information sequences, and at least two check sequences, wherein the first information sequence includes a command type that identifies the frame as a write command, a pointer that identifies the first memory location to which data is stored on the transponder, and a frame identifier that identifies the frame as a command and wherein the second information sequence and each information sequence thereafter includes a string of data to be stored on the transponder and an end of record identifier:
  iv) receiving a command acknowledge frame having an initialization sequence, at least one information sequence of the first predetermined length, and a check sequence of the second predetermined length for each information sequence; and B) transponding by:
  i) receiving the query frame having an initialization sequence, at least one information sequence of the first predetermined length, and a check sequence of the second predetermined length for each information sequence;
  ii) transmitting the query acknowledge frame having an initialization sequence, at least one information sequence of the first predetermined length, and a check sequence of the second predetermined length for each information sequence;
  iii) receiving the command frame having an initialization sequence, at least one information sequence of the first predetermined length, and a check sequence of the second predetermined length for each information sequence; and
  iv) transmitting the command acknowledge frame having an initialization sequence, at least one information sequence of the first predetermined length, and a check sequence of the second predetermined length for each information sequence.

2. The method of claim 1, wherein the method is terminated when an error is detected by any check sequence.

3. The method of claim 1, wherein a check sequence is an error correction code.

4. The method of claim 1, wherein an initialization sequence includes:
  a dotting sequence for recovering clock timing; and
  a sync pattern for establishing data alignment and determining data polarity.

5. The method of claim 4, wherein the sync pattern is one of:
  a first sync pattern transmitted while interrogating; and
  a second sync pattern, different from the first sync pattern, transmitted while transponding.

6. The method of claim 1, wherein the first predetermined length is 17 bits.

7. The method of claim 1, wherein the second predetermined length is 8 bits.

8. The method of claim 1, wherein a check sequence is a cyclic redundancy check sequence.

9. The method of claim 1, wherein a first information sequence of the query frame includes a transponder group type and a frame identifier.

10. The method of claim 1, wherein the command frame is a read command frame.

11. The method of claim 10, wherein the command acknowledge frame is a read acknowledge frame in response to the read command frame.

12. The method of claim 10, wherein a first information sequence of the read command frame includes a command type, a pointer, and a frame identifier.

13. The method of claim 11, wherein the read acknowledge frame includes at least two information sequences, wherein a first information sequence includes a unique transponder code and a frame identifier and each information sequence after the first information sequence includes a string of data and an end of record identifier.

14. The method of claim 1, wherein the command frame is a write command frame.

15. The method of claim 14, wherein the command acknowledge frame is a write acknowledge frame in response to the write command frame.

16. The method of claim 14, wherein the write command frame includes at least two information sequences, wherein a first information sequence includes a command type, a pointer, and a frame identifier and each information sequence after the first information sequence includes a string of data and an end of record identifier.

17. The method of claim 15, wherein the write acknowledge frame includes at least two information sequences, wherein a first information sequence includes a unique transponder code and a frame identifier and a second information sequence includes a transponder configuration identifier and a lock identifier.

18. A method for providing a reliable communication protocol in a radio frequency identification system having an interrogator and a transponder, the method comprising:

A) transmitting, from the interrogator to the transponder, a query frame having an initialization sequence, at least one information sequence of a first predetermined length, and a check sequence of a second predetermined length for each information sequence wherein at least the first information sequence of the query frame includes a transponder group type and a frame identifier and the transponder group type identifies at least one of: a group, classification, and vendor and the frame identifier differentiates the query frame from a command frame;

B) transmitting, from the transponder to the interrogator, a query acknowledge frame having an initialization sequence, at least one information sequence of a first predetermined length, and a check sequence of a second predetermined length for each information sequence;

C) transmitting, from the interrogator to the transponder, a command frame wherein the command frame is one of:

C1) a read command frame that includes an initialization sequence, at least one information sequence, and a check sequence of the second predetermined length for each information sequence wherein the at least one information sequence of the read command frame includes (C1a) a command type that identifies an action to be taken by a transponder, (C1b) a pointer that identifies a first memory location from which to begin the transmission by the transponder, and (C1c) a frame identifier that identifies the frame as a command frame; and C2) a write command frame that includes an initialization sequence, at least two information sequences, and at least two check sequences, wherein the first information sequence includes a command type that identifies the frame as a write command, a pointer that identifies the first memory location to which data is stored on the transponder, and a frame identifier that identifies the frame as a command and wherein the second information sequence and each information sequence thereafter includes a string of data to be stored on the transponder and an end of record identifier; and D) transmitting, from the transponder to the interrogator, a command acknowledge frame having an initialization sequence, at least one information sequence of a first predetermined length, and a check sequence of a second predetermined length for each information sequence, wherein the query frame is represented by a single binary digit that identifies an initial interrogatory transmission, and the query acknowledge frame includes at least two information sequences, wherein a first information sequence includes a unique transponder code and a frame identifier and a second information sequence includes a transponder configuration identifier and a lock identifier.

19. A radio frequency identification system for providing a reliable communication protocol comprising:

(A) an interrogator, having a coverage area, for transmitting a plurality of interrogator frames, each being a query frame, a command frame and receiving at least one of a plurality of transponder frames, wherein each frame in the plurality of interrogator frames and the plurality of transponder frames includes an initialization sequence, at least one information sequence of a first predetermined length, and a check sequence of a second predetermined length for each information sequence and wherein at least the first information sequence of the query frame includes a transponder group type and a frame identifier and the transponder group type identifies at least one of: a group, classification, and vendor and the frame identifier differentiates the query frame from a command frame; and wherein the command frame is one of:

A1) a read command frame that includes an initialization sequence, at least one information sequence, and a check sequence of the second predetermined length for each information sequence wherein the at least one information sequence of the read command frame includes (A1a) a command type that identifies an action to be taken by a transponder, (A1b) a pointer that identifies a first memory location from which to begin the transmission by the transponder, and (A1c) a frame identifier that identifies the frame as a command frame; and A2) a write command frame that includes an initialization sequence, at least two information sequences, and at least two check sequences, wherein the first information sequence includes (A2a) a command type that identifies the frame as a write command, (A2b) a pointer that identifies the first memory location to which data is stored on the transponder, and a (A2c) frame identifier that identifies the frame as a command and wherein the second information sequence and each information sequence thereafter includes a string of data to be stored on the transponder and an end of record identifier; and (B) a transponder, within the coverage area, for transmitting the plurality of transponder frames and receiving at least one of the plurality of interrogator frames.

20. The radio frequency identification system of claim 26, wherein a first information sequence of the read command frame includes a command type, a pointer, and a frame identifier.

21. The radio frequency identification system of claim 20, wherein the initialization sequence includes:

a dotting sequence for recovering clock timing; and a sync pattern for establishing data alignment and determining data polarity.

22. The radio frequency identification system of claim 21, wherein the sync pattern is one of:

a sync pattern for an interrogator frame and is transmitted while interrogating; and a sync pattern for a transponder frame, different from the sync pattern for the interrogator frame, and is transmitted while transponding.

23. The radio frequency identification system of claim 20, wherein the first predetermined length is 17 bits.

24. The radio frequency identification system of claim 20, wherein the second predetermined length is 8 bits.

25. The radio frequency identification system of claim 20, wherein the check sequence is a cyclic redundancy check sequence calculated from each information sequence.

26. The radio frequency identification system of claim 19, wherein an interrogator frame is a read command frame.

27. The radio frequency identification system of claim 26, wherein a transponder frame is a read acknowledge frame in response to the read command frame.

28. The radio frequency identification system of claim 27, wherein the read acknowledge frame includes at least two information sequences, wherein a first information sequence includes a unique transponder code and a frame identifier and each information sequence after the first information sequence includes a string of data stored on the transponder and an end of record identifier.

29. The radio frequency identification system of claim 19, wherein an interrogator frame is a write command frame.

30. The radio frequency identification system of claim 29, wherein the write command frame includes at least two information sequences, wherein a first information sequence includes a command type, a pointer, and a frame identifier and each information sequence after the first information sequence includes a string of data to be stored on the transponder and an end of record identifier.

31. The radio frequency identification system of claim 29, wherein a transponder frame is a write acknowledge frame in response to the write command frame.

32. The radio frequency identification system of claim 31, wherein the write acknowledge frame includes at least two information sequences, wherein a first information sequence includes a unique transponder code and a frame identifier and a second information sequence includes a transponder configuration identifier and a lock identifier.

* * * * *

UNITED STATES PATENT AND TRADEMARK OFFICE
CERTIFICATE OF CORRECTION

PATENT NO. : 5,818,348
DATED : October 6, 1998
INVENTOR(S) : Walczak et al.

It is certified that error appears in the above-indentified patent and that said Letters Patent is hereby corrected as shown below:

Column 10, line 34 claim number "20" should be --26--.

Column 10, line 34 reads "system of claim 26" should be --system of claim 25--.

Column 10, line 38 claim number "21" should be --20--.

Column 10, line 38 reads "system of claim 20" should be --system of claim 19--.

Column 10, line 44 claim number "22" should be --21--.

Column 10, line 44 reads "system of claim 21" should be --system of claim 20--.

Column 10, line 51 claim number "23" should be --22--.

Column 10, line 51 reads "system of claim 20" should be --system of claim 19--.

Column 10, line 53 claim number "24" should be --23--.

Column 10, line 53 reads "system of claim 20" should be --system of claim 19--.

UNITED STATES PATENT AND TRADEMARK OFFICE
CERTIFICATE OF CORRECTION

PATENT NO. : 5,818,348
DATED : October 6, 1998
INVENTOR(S) : Walczak et al.

It is certified that error appears in the above-indentified patent and that said Letters Patent is hereby corrected as shown below:

Column 10, line 55 claim number "25" should be --24--.

Column 10, line 55 reads "system of claim 20" should be --system of claim 19--.

Column 10, line 58 claim number "26" should be --25--.

Column 10, line 60 reads "system of claim 26" should be --system of claim 25--.

Signed and Sealed this

Ninth Day of March, 1999

Attest:

Q. TODD DICKINSON

Attesting Officer

Acting Commissioner of Patents and Trademarks